United States Patent
Fischer et al.

(10) Patent No.: US 6,248,829 B1
(45) Date of Patent: Jun. 19, 2001

(54) POLYMERS OF PROPENE

(75) Inventors: David Fischer, Breunigweiler; John Russell Grasmeder, Dirmstein; Heike Gregorius, Bad Kreuznach; Stefan Seelert, Frankenthal; Franz Langhauser, Ruppertsberg; Wolfgang Micklitz, Neustadt; Klaus-Dieter Rümpler, Wachenheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/268,721

(22) Filed: Mar. 17, 1999

(30) Foreign Application Priority Data

Mar. 20, 1998 (DE) .............................................. 198 12 229

(51) Int. Cl.⁷ .............................. C08F 8/00; C08L 23/00; C08L 23/04
(52) U.S. Cl. ........................... 525/191; 525/197; 525/240
(58) Field of Search ................................... 525/191, 197, 525/240

(56) References Cited

U.S. PATENT DOCUMENTS

| | | | |
|---|---|---|---|
| 3,268,627 | 8/1966 | Emrick et al. | 260/897 |
| 5,483,002 | 1/1996 | Seelert et al. | 525/240 |
| 5,516,848 | 5/1996 | Canich et al. | 525/240 |
| 5,686,533 | * 11/1997 | Gahleitner et al. | 525/240 |

FOREIGN PATENT DOCUMENTS

| | | |
|---|---|---|
| 2142521 | 8/1995 | (CA) . |
| 19533337 | 3/1997 | (DE) . |
| 643084 | 3/1995 | (EP) . |
| 643100 | 3/1995 | (EP) . |

OTHER PUBLICATIONS

Brekner, *Metallocenes*, 1996, pp. 155–177.
Mcalpin, *SPO*, 1995, pp. 125–145, Exxon Chemicals.

* cited by examiner

*Primary Examiner*—Nathan M. Nutter
(74) *Attorney, Agent, or Firm*—Keil & Weinkauf

(57) ABSTRACT

Polymers of propene consist of from 50 to 99.9% by weight of an isotactic propene copolymer (A') and from 0.1 to 50% by weight of a propene homopolymer or a propene copolymer (B'), where a) the propene copolymer (A') consists of from 80 to 99.9 mol % of propene and from 0.1 to 20 mol % of ethene and/or a $C_4$–$C_{12}$-1-olefin, at least 80% of all propene diads are isotactic meso diads, the propene copolymer (A') has a proportion ($X_S$) of material soluble in xylene at 20° C. which satisfies the inequality (1)

$$(X_S) < 542\,400 \exp(-0.1 T_M) + 0.5 \qquad (1),$$

the tensile modulus of elasticity (E) of the propene copolymer (A') in MPa, determined in accordance with ISO 527, obeys the inequality (2)

$$(E) > 1.9 \times 10^{-11} (T_M)^{6.34} + 180 \text{ MPa} \qquad (2),$$

where in both inequalities (1) and (2) $T_M$ is the melting point in ° C., and b) the propene homopolymer or the propene copolymer (B') consists of from 80 to 100 mol % of propene and from 0 to 20 mol % of ethene and/or a $C_4$–$C_{12}$-1-olefin, at least 55% of all regioregular propene diads are isotactic meso diads, an enthalpy of fusion $\Delta H_m$ of less than 50 J/g is observed in the DSC measurement of (B') and no crystalline ex sequences are detectable.

14 Claims, No Drawings

POLYMERS OF PROPENE

BACKGROUND OF THE INVENTION

The present invention relates to polymers of propene consisting of from 50 to 99.9% by weight of an isotactic propene copolymer (A') and from 0.1 to 50% by weight of a propene homopolymer or a propene copolymer (B'), wherein a) the propene copolymer (A') consists of from 80 to 99.9 mol % of propene and from 0.1 to 20 mol % of ethene and/or a $C_4$–$C_{12}$-1-olefin, at least 80% of all propene diads are isotactic meso diads, the propene copolymer (A') has a proportion ($X_S$) of material soluble in xylene at 20° C. which satisfies the inequality (1)

$$(X_S) < 542\,400 \exp(-0.1 T_M) + 0.5 \tag{1},$$

the tensile modulus of elasticity (E) of the propene copolymer (A') in MPa, determined in accordance with ISO 527, obeys the inequality (2)

$$(E) > 1.9 \times 10^{-11} (T_M)^{6.34} + 180 \text{ MPa} \tag{2},$$

where in both inequalities (1) and (2) $T_M$ is the melting point in ° C., and b) the propene homopolymer or the propene copolymer (B') consists of from 80 to 100 mol % of propene and from 0 to 20 mol % of ethene and/or a $C_4$–$C_{12}$-1-olefin, at least 55% of all regioregular propene diads are isotactic meso diads, an enthalpy of fusion $\Delta H_m$ of less than 50 J/g is observed in the DSC measurement of (B') and no crystalline ex sequences are detectable.

The present invention further relates to a process for preparing polymers of propene, their use for producing films, fibers and moldings and also the films, fibers and moldings obtainable in this way.

Random propene copolymers with ethene or with a higher 1-olefin as comonomer prepared using metallocene catalyst systems are well suited to numerous applications in plastics technology (EP-A 668 157, DE-A 19 533 337). This is also true of multiphase propene copolymers, as described in EP-A 643 084, which can also consist of a plurality of different propene copolymers and are used, for example, for producing films, fibers or moldings.

Such random propene copolymers are used, inter alia, in injection molding, particularly in thin-wall injection molding, for example in the production of transparent packaging containers. Here, importance is attached both to high stiffness and transparency of the material and also to a minimum degree of impact toughness and thus resistance to breakage of the moldings produced. In the packaging sector, particularly when foods are to be packed, or in medical applications such as disposable syringes, low proportions of extractable material are often also required.

Compared to propene copolymers prepared using Ziegler-Natta catalysts, random propene copolymers prepared using metallocene catalysts have, at comparable melting points, higher stiffness, better transparency and very low proportions of extractable material [M. -J. Brekner: "Metallocene Based Isotactic Polypropylene For Selected Applications", Proc. Metallocens '96, p. 155 ff., Düsseldorf, Mar. 6–7, 1996; J. J. McAlpin: "Enhanced Performance for Exxpol™ Propylene Polymers in Target Applications", Proc. SPO '95, p. 125 ff., Houston, Sep. 20–22, 1995]. However, they have a significantly lower impact toughness which breaks down virtually completely at temperatures as high as 0° C. For this reason, it is precisely in this area of transparent food packaging where a high resistance to breakage is required even at refrigerator temperatures that random propene copolymers produced using metallocene catalysts are inferior to their conventional predecessors.

BRIEF SUMMARY OF THE INVENTION

It is an object of the present invention to remedy the abovementioned disadvantages and to provide polymers of propene which, compared to the previously known random propene copolymers which are obtained by means of metallocene catalyst systems, have an improved stiffness/impact toughness ratio, particularly at low temperatures too, and also have a high transparency and only a low extractables content.

We have found that this object is achieved by the polymers of propene defined at the outset.

We have also found a process for preparing the novel polymers of propene and their use for producing films, fibers and moldings. The present invention also extends to films, fibers and moldings comprising the novel polymers of propene.

DETAILED DESCRIPTION OF THE INVENTION

The novel polymers of propene consist of from 50 to 99.9% by weight, preferably from 70 to 99.5% by weight and in particular from 85 to 99% by weight, of an isotactic propene copolymer (A') and from 0.1 to 50% by weight, preferably from 0.5 to 30% by weight and in particular from 1 to 15% by weight, of a propene homopolymer or a propene copolymer (B'). The sum of the percentages by weight is always 100. The propene homopolymer and the propene copolymer are hereinafter also referred to, either jointly or separately, as component (B').

The propene copolymer (A') contains from 80 to 99.9 mol %, preferably from 85 to 99.5 mol % and in particular from 90 to 99.5 mol %, of propene and from 0.1 to 20 mol %, preferably from 0.5 to 15 mol % and in particular from 0.5 to 10 mol %, of ethene and/or a $C_4$–$C_{12}$-1-olefin. The sum of the mol % is always 100.

For the purposes of the present invention, $C_4$–$C_{12}$-1-olefins are, in particular, 1-butene, 1-pentene, 4-methyl-1-pentene, 1-hexene, 1-heptene and 1-octene, with particular preference being given to using 1-butene, 1-pentene and 1-hexene.

Furthermore, at least 80%, in particular at least 90%, of all propene diads, i.e. the sequences of two adjacent propene units, in the propene copolymers (A') present in the novel polymers of propene are isotactic meso diads. Isotactic meso diads are two adjacent propene units having the same configuration of the methine carbon (H. L. Frisch et al., J.Chem. Physics., 1966, 45, p. 1565).

In addition, the propene copolymer (A') has a proportion ($X_S$) of materials soluble in xylene at 20° C. which satisfies the inequality (1)

$$(X_S) < 542\,400 \exp(-0.1 T_M) + 0.5 \tag{1},$$

where $T_M$ is the melting point in ° C. determined by DSC.

The propene copolymer (A') also has a tensile modulus of elasticity (E) in MPa, determined in accordance with ISO 527, which obeys the inequality (2)

$$(E) > 1.9 \times 10^{-11}(T_M)^{6.34} + 180 \text{ MPa} \qquad (2),$$

where $T_M$ is likewise the melting point determined by DSC.

The component (B'), i.e. the propene homopolymer or the propene copolymer (B'), contains from 80 to 100 mol %, in particular from 85 to 100 mol %, of propene and from 0 to 20 mol %, in particular from 0 to 15 mol %, of ethene and/or a $C_4$–$C_{12}$-1-olefin, where the sum of the mol % is always 100.

Here, the term $C_4$–$C_{12}$-1-olefin refers to the same comonomers used in the propene copolymers (A').

Thus, the component (B') can be either a propylene homopolymer or a propene copolymer which then consists of from 80 to 99.99 mol %, in particular from 85 to 99.5 mol %, of propene and from 0.01 to 20 mol %, in particular from 0.5 to 15 mol %, of ethene and/or a $C_4$–$C_{12}$-1-olefin. The sum of the mol % is again always 100.

Furthermore, at least 55%, in particular at least 60% and preferably at least 80%, of all regioregular propene diads, i.e. the sequences of two adjacent propene units linked head-to-tail, in the component (B') are present as isotactic meso diads.

In addition, the propene homopolymers or propene copolymers used as component (B') have an enthalpy of fusion $\Delta H_m$ determined by means of DSC of less than 50 J/g, in particular less than 40 J/g. They also have no crystalline ex sequences, by which are meant crystallizable sequences of a plurality of directly successive ethene units.

Preferred propene homopolymers or propene copolymers (B') have a proportion of regioirregular '1-3'-inserted propene units of at least 4%, in particular at least 6%, based on all propene units. The '1-3' insertion of propene units is the linear incorporation of propene into the main polymer chain as a trimethylene sequence. The '1-3' insertion is determined by means of $^{13}C$-NMR-spectroscopy (Grassi et al., Macromolecules 21, 1988, p.617).

Preference is also given to using, as component (B'), propene homopolymers or propene copolymers which have a glass transition temperature ($T_g$), determined by DSC, of less than –10° C., in particular less than –15° C.

Preferred polymers of propene consisting of the propylene copolymer (A') and component (B') preferably have a tensile modulus of elasticity (E) in MPa, determined in accordance with ISO 527, which obeys the inequality (2')

$$(E) > 0.02093(X)^2 - 8.762(X) + 1780 \text{ MPa} \qquad (2'),$$

where X is the Charpy impact toughness in accordance with ISO 179-2/1 eU, at 0° C. In the case of particularly preferred polymers of propene, the tensile modulus of elasticity (E) should be more than 1150 MPa.

In addition, such polymers of propene have a proportion of material soluble in xylene at 20° C. of less than 5% by weight. They preferably consist of from 80 to 99.9 mol %, in particular from 85 to 99.5 mol %, of monomer units derived from propene and from 0.1 to 20 mol %, in particular from 0.5 to 15 mol %, of monomer units derived from ethene and/or a $C_4$–$C_{12}$-1-olefin, where the sum of the mol % is always 100. More than 60%, in particular more than 80%, of all propene diads in the particularly preferred novel polymers of propene are isotactic meso diads.

The propene copolymers (A') and the propene homopolymers (B') or the propene copolymers (B') used in the novel polymers of propene are preferably prepared by polymerizing the respective monomers in the presence of a metallocene catalyst system which comprises B) at least one metallocene complex and
C) a compound capable of forming metallocenium ions.

The metallocene catalyst system preferably further comprises

A) an organic or inorganic support.

The metallocene catalyst system used for preparing the propene copolymers (A'), the propene homopolymers (B') or the propene copolymers (B') can further comprise, apart from the catalyst components A), B) and C), at least one organic metal compound of an alkali metal or alkaline earth metal or a metal of main group III of the Periodic Table as catalyst component D).

The polymerization for preparing the propene copolymers (A'), the propene homopolymers (B') or the propene copolymers (B') with the aid of such metallocene catalyst systems is carried out at from –50 to 300° C., preferably from 0 to 150° C., and at pressures in the range from 0.5 to 3000 bar, preferably in the range from 1 to 100 bar. In this process, the residence times of the respective reaction mixtures should be set to from 0.5 to 5 hours, in particular from 0.7 to 3.5 hours. It is also possible to use, inter alia, antistatics and molecular weight regulators, for example hydrogen, in the polymerization.

The polymerization can be carried out in solution, in suspension, in liquid monomers or in the gas phase. The polymerization is preferably carried out in liquid monomers (bulk method) or in the gas phase, preferably the stirred gas phase.

The process, which is likewise subject matter of the present invention, can be carried out either continuously or batchwise. Suitable reactors are, for example, continuously operated stirred vessels or loop reactors; if desired, it is also possible to use a plurality of stirred vessels or loop reactors connected in series (reactor cascade).

The metallocene catalyst systems used preferably comprise an inorganic support as catalyst component A), for example magnesium chloride. As inorganic support, it is also possible to use an inorganic oxide which has a pH, determined by the method of S. R. Morrison, "The Chemical Physics of Surfaces", Plenum Press, New York [1977], page 130 ff., of from 1 to 6 and voids and channels whose macroscopic proportion by volume in the total particle is in the range from 5 to 30%. Particular preference is given to using inorganic oxides whose pH, i.e. the negative logarithm to the base 10 of the proton concentration, is in the range from 2 to 5.5.

The inorganic supports used are particularly preferably inorganic oxides which have a mean particle diameter of from 5 to 200 $\mu$m, in particular from 20 to 90 $\mu$m, and a mean particle diameter of the primary particles of from 1 to 20 $\mu$m, in particular from 1 to 5 $\mu$m. The primary particles here are porous, granular particles. The primary particles have pores having a diameter of, in particular, from 1 to 1000 Å. Furthermore, the inorganic oxides to be used also have voids and channels having a mean diameter of from 0.1 to 20 $\mu$m, in particular from 1 to 15 $\mu$m. The inorganic oxides also have, in particular, a pore volume of from 0.1 to 10 cm$^3$/g, preferably from 1.0 to 5.0 cm$^3$/g, and a specific surface area of from 10 to 1000 m$^2$/g, preferably from 100 to 500 m$^2$/g. Such finely divided inorganic oxides are obtainable, for example, by spray drying milled hydrogels and are also commercially available.

Preferred inorganic supports are, in particular, oxides of silicon, of aluminum, of titanium or one of the metals of main group I or II of the Periodic Table. Very particularly preferred inorganic oxides are aluminum oxide, magnesium oxide, sheet silicates and silica gel ($SiO_2$).

As catalyst component A), it is also possible to use cogels, i.e. mixtures of at least two different inorganic oxides.

The catalyst component A) can also be an organic support, for example a thermoplastic polymer. Preferred organic supports are polymers of 1-alkenes, in particular propene homopolymers or propene copolymers, also ethene homopolymers or ethene copolymers.

Preference is given to using from 0.1 to 10,000 $\mu$mol, in particular from 5 to 200 $\mu$mol, of metallocene complex, i.e. the component B), per gram of support, i.e. the component A).

As catalyst component B), the metallocene catalyst system used comprises one or more metallocene complexes. Suitable metallocene complexes are, in particular, those of the formula (I)

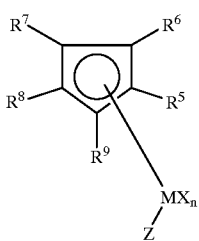

(I)

where the substituents have the following meanings:
  M is titanium, zirconium, hafnium, vanadium, niobium or tantalum or an element of transition group III of the Periodic Table and the lanthanides,
  X is fluorine, chlorine, bromine, iodine, hydrogen, $C_1$–$C_{10}$-alkyl, $C_6$–$C_{15}$-aryl, alkylaryl having from 1 to 10 carbon atoms in the alkyl radical and from 6 to 20 carbon atoms in the aryl radical, $-OR^{10}$ or $-NR^{10}R^{11}$,
  n is an integer from 1 to 3, where n corresponds to the valence of M minus 2,
where
  $R^{10}$ and $R^{11}$ are $C_1$–$C_{10}$-alkyl, $C_6$–$C_{15}$-aryl, alkylaryl, arylalkyl, fluoroalkyl or fluoroaryl each having from 1 to 10 carbon atoms in the alkyl radical and from 6 to 20 carbon atoms in the aryl radical,
  $R^5$ to $R^9$ are hydrogen, $C_1$–$C_{10}$-alkyl, 5- to 7-membered cycloalkyl which in turn may bear a $C_1$–$C_{10}$-alkyl group as substituent, $C_6$–$C_{15}$-aryl or arylalkyl, where two adjacent radicals may also together form a saturated or unsaturated cyclic group having from 4 to 15 carbon atoms, or $Si(R^{12})_3$ where
  $R^{12}$ is $C_1$–$C_{10}$-alkyl, $C_3$–$C_{10}$-cycloalkyl or $C_6$–$C_{15}$-aryl, Z is X or 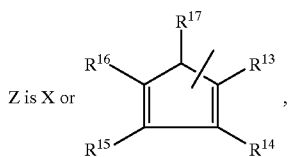, where the radicals
  $R^{13}$ to $R^{17}$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a saturated or unsaturated cyclic group having from 4 to 25 carbon atoms, or $Si(R^{18})_3$ where
  $R^{18}$ is $C_1$–$C_{10}$-alkyl, $C_6$–$C_{15}$-aryl or $C_3$–$C_{10}$-cycloalkyl, or the radicals $R^8$ and Z together form an $-R^{19}-A-$ group where $R^{19}$ is

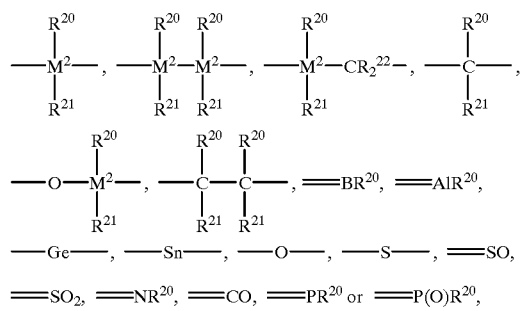

where $R^{20}$, $R^{21}$ and $R^{22}$ are identical or different and are each a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group or two adjacent radicals together with the atoms connecting them form a ring, and $M^2$ is silicon, germanium or tin, A is 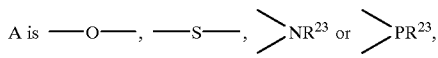

where $R^{23}$ is $C_1$–$C_{10}$-alkyl, $C_6$–$C_{15}$-aryl, $C_3$–$C_{10}$-cycloalkyl, alkylaryl or $Si(R^{24})_3$, $R^{24}$ is hydrogen, $C_1$–$C_{10}$-alkyl, $C_6$–$C_{15}$-aryl which may in turn bear $C_1$–$C_4$-alkyl groups as substituents or $C_3$–$C_{10}$-cycloalkyl or the radicals $R^8$ and $R^{16}$ together form an $-R^{19}-$ group.

Among the metallocene complexes of the formula I, preference is given to

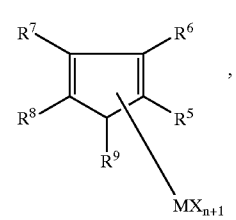

Ia

-continued

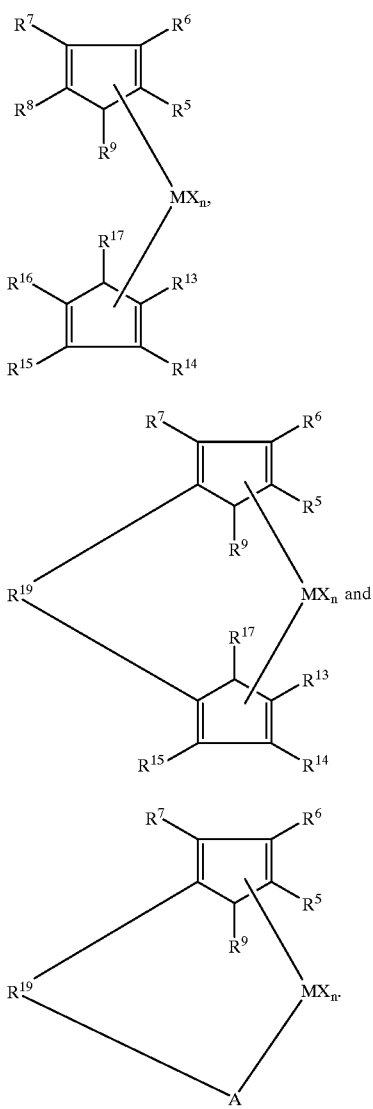

The radicals X can be identical or different; they are preferably identical.

Among the compounds of the formula Ia, particular preference is given to those in which

| M | is titanium, zirconium or hafnium, |
| X | is chlorine, $C_1$—$C_4$-alkyl or phenyl, |
| n | is 2 and |
| $R^5$ to $R^9$ | are hydrogen or $C_1$—$C_4$-alkyl |

Among the compounds of the formula Ib, preference is given to those in which

| M | is titanium, zirconium or hafnium, |
| X | is chlorine, $C_1$—$C_4$-alkyl or phenyl, |
| n | is 2, |
| $R^5$ to $R^9$ | are hydrogen, $C_1$—$C_4$-alkyl or $Si(R^{12})_3$, and |
| $R^{13}$ to $R^{17}$ | are hydrogen, $C_1$—$C_4$-alkyl or $Si(R^{18})_3$. |

Particularly useful compounds of the formula Ib are those in which the cyclopentadienyl radicals are identical.

Examples of particularly useful compounds are:
bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride
and also the corresponding dimethylzirconium compounds.

Among the compounds of the formula Ic, particular preference is given to those in which $R^5$ and $R^{13}$ are identical and are hydrogen or $C_1$–$C_{10}$-alkyl, $R^9$ and $R^{17}$ are identical and are hydrogen, methyl, ethyl, isopropyl or tert-butyl, $R^6$, $R^7$, $R^{14}$ and $R^{15}$ have the meanings $R^7$ and $R^{15}$ are $C_1$–$C_4$-alkyl $R^6$ and $R^{14}$ are hydrogen or two adjacent radicals $R^6$ and $R^7$ or $R^{14}$ and $R^{15}$ together form a cyclic group having from 4 to 25 carbon atoms,

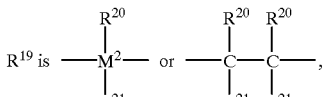

M is titanium, zirconium or hafnium and
X is chlorine, $C_1$–$C_4$-alkyl or phenyl.

Examples of particularly useful complexes are:
dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluoroenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-ethylindenyl)zirconium dichloride,
dimethylsilanediylbis(2-methylbenzindenyl)zirconium dichloride,
dimethylsilanediylbis(2-ethylbenzindenyl) zirconium dichloride,
ethylphenylsilanediylbis(2-ethylbenzindenyl)zirconium dichloride,
ethylphenylsilanediylbis(2-methylbenzindenyl)zirconium dichloride,
diphenylsilanediylbis(2-methylbenzindenyl)zirconium dichloride,
diphenylsilanediylbis(2-ethylbenzindenyl)zirconium dichloride, and diphenylsilanediylbis(2-methylindenyl)hafnium dichloride and also the corresponding dimethylzirconium compounds.

Further examples of suitable complexes are:
dimethylsilanediylbis(2-methyl-4-phenylindenyl)zirconium dichloride,
dimethylsilanediylbis(2-methyl-4-naphthylindenyl) zirconium dichloride,
dimethylsilanediylbis(2-methyl-4-isopropylindenyl) zirconium dichloride and
dimethylsilanediylbis(2-methyl-4,6-diisopropylindenyl) zirconium dichloride and also the corresponding dimethylzirconium compounds.

In the case of the compounds of the formula Id, particular preference is given to those in which M is titanium or zirconium, X is chlorine, $C_1$–$C_4$-alkyl or phenyl,

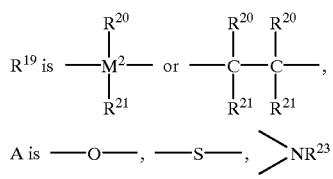

and $R^5$ to $R^7$ and $R^9$ are hydrogen, $C_1$–$C_{10}$-alkyl, $C_3$–$C_{10}$-cycloalkyl, $C_6$–$C_{15}$-aryl or $Si(R^{12})_3$, or two adjacent radicals form a cyclic group having from 4 to 12 carbon atoms.

The synthesis of such complexes can be carried out by methods known per se, with preference being given to reacting the appropriately substituted, cyclic hydrocarbon ions with halides of titanium, zirconium, hafnium, vanadium, niobium or tantalum.

Examples of appropriate preparative methods are described, for example, in Journal of Organometallic Chemistry, 369 (1989), 359–370.

It is also possible to use mixtures of various metallocene complexes.

As catalyst component C), the metallocene catalyst system to be used comprises a compound capable of forming metallocenium ions.

Suitable compounds capable of forming metallocenium ions are strong, uncharged Lewis acids, ionic compounds containing Lewis-acid cations and ionic compounds containing Brönsted acids as cations.

As strong, uncharged Lewis acids, preference is given to compounds of the formula II $$M^3X^1X^2X^3 \qquad\qquad II$$

where $M^3$ is an element of main group III of the Periodic Table, in particular B, Al or Ga, preferably B, $X^1, X^2$ and $X^3$ are hydrogen, $C_1$–$C_{10}$-alkyl, $C_6$–$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Particular preference is given to compounds of the formula II in which $X^1$, $X^2$ and $X^3$ are identical, preferably tris(pentafluorophenyl)borane.

Suitable ionic compounds containing Lewis-acid cations are compounds of the formula III

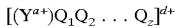 III where

| | |
|---|---|
| Y | is an element of main groups I to VI or transition groups I to VIII of the Periodic Table, |
| $Q_1$ to $Q_z$ | are singly negatively charged groups such as $C_1$–$C_{28}$-alkyl, $C_6$–$C15$-aryl, alkylaryl, arylalkyl, haloalkyl, haloaryl each having from 6 to 20 carbon atoms in the aryl part and from 1 to 28 carbon atoms in the alkyl part, $C_3$–$C_{10}$-cycloalkyl, which may bear $C_1$–$C_{10}$-alkyl groups as substituents, halogen, $C_1$–$C_{28}$-alkoxy, $C_6$–$C_{15}$-aryloxy, silyl or mercaptyl groups, |
| a | is an integer from 1 to 6, |
| z | is an integer from 0 to 5 and |
| d | corresponds to the difference a–z, but d is greater than or equal to 1. |

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation. They preferably have non-coordinating counterions, in particular boron compounds as are also mentioned in WO-A 91/09882, preferably tetrakis (pentafluorophenyl)borate.

Ionic compounds containing Brönsted acids as cations and preferably likewise non-coordinating counterions are mentioned in WO-A 91/09882; the preferred cation is N,N-dimethylanilinium.

The amount of compound C) capable of forming metallocenium ions which is used is preferably from 0.1 to 10 equivalents, based on the metallocene complex I.

Particularly useful compounds C) capable of forming metallocenium ions are open-chain or cyclic aluminoxane compounds of the formula IV or V

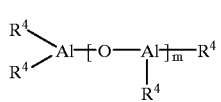 IV

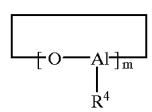 V where $R^4$ is a $C_{1-C4}$-alkyl group, preferably a methyl or ethyl group, and m is an integer from 5 to 30, preferably from 10 to 25.

The preparation of these oligomeric aluminoxane compounds is customarily carried out by reacting a solution of trisalkylaluminum with water and is described, for example, in EP-A 284 708 and U.S. Pat. No. 4,794,096.

The oligomeric aluminoxane compounds obtained in this way are generally in the form of mixtures of both linear and cyclic chain molecules of various lengths, so that m is to be regarded as a mean. The aluminoxane compounds can also be present in admixture with other metal alkyls, preferably aluminum alkyls.

Both the metallocene complexes (component B) and the compound capable of forming metallocenium ions (component C) are preferably used in solution; as solvent, particular preference is given to aromatic hydrocarbons having from 6 to 20 carbon atoms, in particular xylenes and toluene.

As catalyst component C), it is also possible to use aryloxyaluminoxanes as described in U.S. Pat. No. 5,391, 793, aminoaluminoxanes as described in U.S. Pat. No. 5,371,260, aminoaluminoxane hydrochlorides as described in EP-A 633 264 and siloxyaluminoxanes as described in EP-A 621 279.

It has been found to be advantageous to use the metallocene complexes and the oligomeric aluminoxane compound in such amounts that the atomic ratio of aluminum from the oligomeric aluminoxane compound to the transition metal from the metallocene complexes is in the range from 10:1 to $10^6$:1, in particular in the range from 10:1 to $10^4$:1.

The metallocene catalyst system used for preparing the propene copolymer (A') or (B') or the propene homopolymer (B') can further comprise, as catalyst component (D), a metal compound of the formula VI

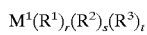

where

| | |
|---|---|
| $M^1$ | is an alkali metal, an alkaline earth metal or a metal of main group III of the Periodic Table, i.e. boron, aluminum, gallium, indium or thallium, |
| $R^1$ | is hydrogen, $C_1$—$C_{10}$-alkyl, $C_6$—$C_{15}$-aryl, alkylaryl or arylalkyl each having from 1 to 10 carbon atoms in the alkyl radical and from 6 to 20 carbon atoms in the aryl radical, |
| $R^2$ and $R^3$ | are hydrogen, halogen, $C_1$—$C_{10}$-alkyl, $C_6$—$C_{15}$-aryl, alkylaryl, arylalkyl or alkoxy each having from 1 to 10 carbon atoms in the alkyl radical and from 6 to 20 carbon atoms in the aryl radical, |
| r | is an integer from 1 to 3 |
| and | |
| s and t | are integers from 0 to 2, where the sum r + s + t corresponds to the valence of $M^1$. |

Among the metal compounds of the formula VI, preference is given to those in which

| | |
|---|---|
| $M^1$ | is lithium, magnesium or aluminum and |
| $R^1$ to $R^3$ | are $C_1$—$C_{10}$-alkyl. |

Particularly preferred metal compounds of the formula VI are
n-butyllithium n-butyl-n-octylmagnesium,
n-butyl-n-heptylmagnesium, tri-n-hexylaluminum,
triisobutylaluminum, triethylaluminum and trimethylaluminum.

If a catalyst component D) is used, it is preferably present in the catalyst system in an amount of from 800:1 to 1:1, in particular from 500:1 to 50:1(molar ratio of $M^1$ in formula VI to transition metal M in formula I).

The catalyst components B) and C) and, if desired, A) and D) are used together as metallocene catalyst system.

The preparation of the novel polymers of propene can be carried out by a number of processes which are likewise subject matter of the present invention. In one of these processes, the propene copolymers (A) and (B') or the propene homopolymer (B') obtained with the aid of the above-described metallocene catalyst system are, after they have been prepared separately, physically mixed with one another at from 150 to 300° C., in particular from 180 to 280° C. In this way, the novel polymers of propene are formed as a blend of the propene copolymer (A') and the propene copolymer (B') or the propene homopolymer (B').

The physical mixing is carried out in customary mixing equipment, for example in kneaders, Brabender mixers, in mills or else in extruders, preferably in extruders. Here, twin-screw extruders have been found to be particularly advantageous.

In another process which is likewise subject matter of the present invention, the constituents of the polymers of propene, viz. the propene copolymers (A') and (B') or the propene homopolymer (B') are prepared in situ, i.e. together in a reactor with the aid of cosupported metallocene catalysts. The polymerization is carried out at from −50 to 300° C., in particular from 0 to 150° C., and pressures of from 0.5 to 3000 bar, in particular from 1 to 100 bar. The metallocene catalyst system used comprises, apart from a compound C) capable of forming metallocenium ions, two different metallocene complexes B) and also, if desired, a support A) and, if desired, an organic metal compound of an alkali metal or an alkaline earth metal or a metal of main group III of the Periodic Table as catalyst component D).

As catalyst components A), B), C) and D), it is possible to use the same compounds as have been described above for the preparation of the propene copolymers (A') and (B') or the propene homopolymer (B'). As regards the specific process conditions, reference may likewise be made to the above description.

The novel polymers of propene have, inter alia, a very good stiffness/impact toughness ratio, a low extractables content and a high transparency, which is made evident by haze values of less than 20%. They are suitable for producing films, fibers and moldings.

The processes for preparing the polymers of propene, which processes are likewise subject matter of the present invention, are relatively simple and have a high productivity.

EXAMPLES

Example 1

Preparation of a Supported Metallocene Catalyst
a) Preparation of the support material 1000 g of silica gel (SG 332, particle diameter 50 μm, from Grace; baked out for 8 hours at 180° C. under reduced pressure (1 mbar)) where suspended in 5 l of toluene under an $N_2$ atmosphere. At 18° C., 7.75 l (6.83 kg) of 1.53 molar methylaluminoxane (MAO) solution (in toluene, from Witco) were added over a period of 120 minutes. The mixture was stirred for another 7 hours at room temperature, filtered and the filter cake was washed twice with 2.5 l each time of toluene. It was subsequently dried under reduced pressure.

b) Loading with the metallocene complex 1 kg of the MAO-laden silica gel prepared under a) was placed in an evacuated vessel. Subsequently, a solution of 5.8 g (10 mmol) of rac-dimethylsilylenebis(2-methylbenzindenyl)zirconium dichloride in 1.32 l of 1.53 molar MAO solution (toluene) was added while stirring. After bringing the pressure to atmospheric pressure using nitrogen ($N_2$), the materials were mixed for 30 minutes at room temperature. Subsequently, the main amount of solvent was then distilled off under reduced pressure at 20° C. (until no more solvent went over). The temperature was then increased in 5° C. steps to 55° C. and the catalyst was dried until it remained as an orange, free-flowing powder.

Example 2

Preparation of a Propene-1-Butene Copolymer (A') in a Continuous Gas-Phase Process 10 g/h of the supported metallocene catalyst prepared in Example 1 were metered into a 200 l gas-phase reactor. Propene and 1-butene were fed in and copolymerized at a reactor pressure of 24 bar and a polymerization temperature of 60° C. while introducing 30 mmol/h of triisobutylaluminum (1 molar solution in heptane). The polymerization was carried out continuously over a period of 48 hours. 97.4 mol % of propene and 2.6 mol % of 1-butene were used. The reactor output was 20 kg/h. A copolymer powder was obtained. The following were measured on the copolymer: $T_m$=141.8° C., [η]=2.26 dl/g, $M_n$=145,900 g/mol, $M_w$=266,400 g/mol, $M_w/M_n$=1.83, MFI=3.8 g/10', $X_S$=0.19% by weight, modulus of elasticity: 1293 MPa; butene content: 0.6 mol %; proportion of isotactic meso diads, based on all propene diads: 97.3%.

Example 3

Preparation of a Propene Homopolymer (B') Having a Reduced Crystallinity

A dry 10 l autoclave which had been flushed with $N_2$ was charged with 26.1 ml of 1.53 molar MAO solution (40 mmol based on aluminum) and 3500 g of liquid propene. Subsequently, while stirring at room temperature, 46 mg of rac-ethylenebis(4,7-dimethyl-4,5,6,7-tetrahydroindenyl) zirconium dichloride dissolved in 20 ml of absolute toluene were blown in with $N_2$ via a lock. The autoclave was heated to 60° C. and polymerization was carried out at this temperature for 90 minutes. After the reaction time had expired, the polymerization was stopped by venting the remaining propene and the product was discharged at 60° C. through a bottom valve. This gave 750 g of homopolymer on which the following were measured: $T_m$=148.3° C., $\Delta H_m$=11 J/g, [η]= 0.49 dl/g, $M_n$=27,500 g/mol, $M_w$=47,000 g/mol, $M_w/M_n$= 1.70, $X_S$=0.96% by weight; proportion of '1-3'-inserted $C_3$ units:14.4 mol %; $T_g$: −30.4° C., proportion of isotactic meso diads, based on all regioregular propene diads: 92.4%; no crystalline ex sequences detectable.

Example 4

Preparation of a Polymer of Propene According to the Present Invention 4.95 kg of the propene copolymer obtained in Example 2 and 0.05 kg of the propene homopolymer obtained in Example 3 were, with addition of 600 ppm of Irganox® 1010, 600 ppm of Irgafos® 168, 300 ppm of calcium stearate and 0.23% by weight of Millad® 3988 (as additives), processed at 230° C. in a twin-screw extruder to give a homogeneous blend. The measured values obtained are summarized in Table 1.

Irganox® 1010 from Ciba-Geigy is pentaerythrityl tetrakis[3-(3,5-bis(1,1-dimethylethyl)-4-hydroxyphenyl) propionate] and Irgafos®168, likewise from Ciba-Geigy, is tris(2,4-bis-tert-butylphenyl) phosphite. Millad®3988 is dimethyldibenzylidenesorbitol and is sold by Milliken.

Example 5

Preparation of a Polymer of Propene According to the Present Invention 4.9 kg of the propene copolymer obtained in Example 2 and 0.1 kg of the propene homopolymer obtained in Example 3 were, with addition of 600 ppm of Irganox 1010, 600 ppm of Irgafos 168, 300 ppm of calcium stearate and 0.23% by weight of Millad 3988, processed at 230° C. in a twin-screw extruder to give a homogeneous blend. The measured values obtained are summarized in Table 1.

Example 6

Preparation of a Polymer of Propene According to the Present Invention 4.825 kg of the propene copolymer obtained in Example 2 and 0.175 kg of the propene homopolymer obtained in Example 3 were, with addition of 600 ppm of Irganox 1010, 600 ppm of Irgafos168, 300 ppm of calcium stearate and 0.23% by weight of Millad 3988, processed at 230° C. in a twin-screw extruder to give a homogeneous blend. The measured values obtained are summarized in Table 1.

Example 7

Preparation of a Polymer of Propene According to the Present Invention 4.75 kg of the propene copolymer obtained in Example 2 and 0.25 kg of the propene homopolymer obtained in Example 3 were, with addition of 600 ppm of Irganox 1010, 600 ppm of Irgafos 168, 300 ppm of calcium stearate and 0.23% by weight of Millad 3988, processed at 230° C. in a twin-screw extruder to give a homogeneous blend. The measured values obtained are summarized in Table 1.

Comparative Example A 5.0 kg of a propene copolymer (Novolen® 3240 NC from BASF) were, as described in Examples 4 to 7, processed together with 600 ppm of Irganox 1010, 600 ppm of Irgafos 168, 300 ppm of calcium stearate and 0.23% by weight of Millad 3988 in a twin-screw extruder to give a homogeneous blend. Novolen® 3240 NC is a propene copolymer containing 2.5% by weight (3.7 mol %) of copolymerized ethene, having an MFI of 11 g/10 min at 230° C. and 2.16 kg, in accordance with ISO 1133, and obtained by gas-phase polymerization of propene and ethene using a Ziegler-Natta catalyst as described, for example, in U.S. Pat. No. 5,288,824. The resulting measured values are summarized in Table 1 below.

Comparative Example B 5.0 kg of a propene copolymer (Novolen® 3248 TC from BASF) were, as described in Comparative Example A, processed together with the same amount of Irganox 1010, Irgafos 168, calcium stearate and Millad 3988 by an analogous method. Novolen® 3248 TC is a propene copolymer containing 2.5% by weight (3.7 mol %) of copolymerized ethene, having an MFI of 45 g/10 min at 230° C. and 2.16 kg, in accordance with ISO 1133, and likewise obtained by gas-phase polymerization of propene and ethene using a Ziegler-Natta catalyst as described, for example, in U.S. Pat. No. 5,288,824. The resulting measured values are summarized in Table 1 below.

Example 8

Preparation of a Polymer of Propene According to the Present Invention by In Situ Polymerization Using Two Different Metallocene Complexes a) Preparation of the catalyst a1: MAO-laden silica gel ($SiO_2$):

1000 g of silica gel (SG 332, 50 μm, from Grace; baked out for 8 hours at 180° C. under reduced pressure (1 mbar)) were suspended in 5 l of toluene under an $N_2$ atmosphere. At 18° C., 7.75 l (6.83 kg) of 1.53 molar methylaluminoxane solution (in toluene, from Witco) were added over a period of 120 minutes. Subsequently, the mixture was stirred for another 7 hours at room temperature, filtered and the filter cake was washed twice with 2.5 l each time of toluene. The support precursor was then dried under reduced pressure.

a2: Loading with metallocene:

10 g of the MAO-laden silica gel prepared under a) were placed in an evacuated vessel. Subsequently, a solution of 52.2 mg (90 μmol) of rac-dimethylsilylenebis(2-methylbenzindenyl)zirconium dichloride and 4.6 mg (10 μmol) of rac-ethylenebis(4,7-dimethyl-4,5,6,7-tetrahydroindenyl)zirconium dichloride in 13.2 ml of 1.53 molar MAO solution (see above) and 36.8 ml of dried toluene were added while stirring. After bringing the pressure to atmospheric pressure using $N_2$, the material was mixed for 30 minutes at room temperature. The main amount of solvent was then distilled off under reduced pressure at 20° C. (until no more solvent went over). The temperature was subsequently slowly increased to 55° C. and the catalyst was dried under reduced pressure until it remained as an orange, free-flowing powder.

b) Polymerizations 20 mmol of triisobutylaluminum (TiBA; 10 ml of a 2 molar solution in heptane) were placed in a dry 10 l autoclave which had been flushed with $N_2$. After addition of 3500 g of liquid propene and about 50 g of liquid 1-butene, 945 mg of supported metallocene catalyst (prepared as above) were blown in with $N_2$ via a lock at room temperature while stirring. The autoclave was subsequently heated to 60° C. and polymerization was carried out at this temperature for 90 minutes. After the reaction time had expired, the polymerization was stopped by venting the remaining propene/1-butene mixture and the product was discharged through a bottom valve. This gave 1850 g of polymer powder (productivity: 1960 g of copolymer/g of catalyst).

Example 8 was repeated another two times, once using 930 mg of catalyst to give a total of 1820 g of copolymer (productivity: 1960 g of copolymer/g of catalyst) and once more using 945 mg of catalyst to give 1740 g of copolymer (productivity: 1840 g of copolymer/g of catalyst).

The polymer from the three polymerizations was homogeneously mixed, admixed with additives as described in Example 4, granulated and tested. The measured values obtained are summarized in Table 1.

The properties reported in the examples were determined as follows:

Comonomer content and proportion of '1-3'-inserted propene units, and also proportion of meso diads: by means of $^{13}C$-NMR Melting point ($T_M$): by means of DSC (differential scanning calorimetry)

Proportion of xylene-soluble material ($X_S$):

500 ml of distilled xylene (isomer mixture) were placed in a 1 liter three-neck flask fitted with stirrer, reflux condenser and thermometer and were heated to 100° C. The polymer was introduced at this temperature, the mixture was subsequently heated to the boiling point of xylene and refluxed for 60 minutes. Heating was subsequently stopped and the mixture was cooled to 5° C. over a period of 20 minutes using a cooling bath and was then warmed again to 20° C. This temperature was held for 30 minutes. The polymer which precipitated was filtered off and exactly 100 ml of the filtrate were placed in a tared 250 ml one-neck flask. The solvent was removed from this solution on a rotary evaporator. The residue was then dried for 2 hours at 80° C./200 torr in a vacuum drying oven. After cooling, the residue was weighed.

The proportion of xylene soluble material is given by $$X_S = \frac{g \times 500 \times 100}{G \times V}$$

$X_s$ = proportion of xylene-soluble material in %
g = amount found
G = weight of polymer sample
V = volume of filtrate used

| | |
|---|---|
| Molar mass (number average) $M_n$: | by means of gel permeation chromatography |
| Molar mass (weight average) $M_w$: | by means of gel permeation chromatography |
| Polymer dispersity $M_w/M_n$: | by means of gel permeation chromatography |
| proportion of xylene-soluble material Xc, DSC: | by means of DSC (from $\Delta H_M$: $\Delta H_{M,100\%}$ = 209 J/g) [1] |
| Viscosity [η]: | by viscometry in decalin at 135° C. |
| Melt flow index (MFI): | in accordance with ISO 1133 |
| Tensile modulus of elasticity: | in accordance with ISO 527 |
| Charpy impact toughness: | in accordance with ISO 179-2/1eU |
| Charpy notched impact toughness: | in accordance with ISO 179-2/1eA |
| Haze: | in accordance with ASTM D 1003, test carried out on 2 mm disks |
| Glass transition temperature (Tg): | by means of DSC [2] |
| Enthalpy of fusion ($\Delta H_M$): | by means of DSC [2] |

[1] Using the method of R. P. Quirk, M. A. A. Alsamarraie, "Physical Constants of Polypropylene", in J. Brandrup, E. H. Immergut (EDS.) "Polymer Handbook", J. Wiley & Sons, New York, 1989
[2] Heating rate = 20° C./min, previously cooled from the melt (210° C.) at 10° C./min.

TABLE 1

| | | Example 4 | Example 5 | Example 6 | Example 7 | Comp. Ex. A | Comp. Ex. B | Example 8 |
|---|---|---|---|---|---|---|---|---|
| MFR (230° C./2.16 kg; n. ISO 1133) | g/10 min' | 4.5 | 4.6 | 4.8 | 5.1 | 10.7 | 42.3 | — |
| $M_n$: | g/mol | 145,600 | 128,300 | 133,100 | 117,400 | — | — | 153,800 |
| $M_w$: | g/mol | 265,500 | 258,200 | 266,000 | 257,500 | — | — | 296,300 |
| $M_w/M_n$: | | 1.8 | 2.0 | 2.0 | 2.2 | — | — | 1.93 |
| $T_m$: | ° C. | 142.3 | 142.3 | 142.4 | 142.3 | 147.9 | 148.6 | 143.6 |
| $\Delta H_m$: | J/g | 87.6 | 87.2 | 85.6 | 85.5 | 87.5 | 90.5 | 92.0 |
| $X_{c,DSC}$: | % | 41.9 | 41.7 | 41.0 | 40.9 | 41.9 | 43.3 | 44.0 |
| $X_L$: | w-% | 1.5 | 2.4 | 3.6 | 4.8 | 5.2 | 5.5 | 2.2 |
| E-Modul (n. ISO 527): | MPa | 1326 | 1277 | 1212 | 1173 | 1030 | 1134 | 1179 |
| Charpy impact toughness: +23° C. | kJ/m² | 200 | 220 | 228 | 236 | — | 168 | — |

TABLE 1-continued

|  |  |  | Example 4 | Example 5 | Example 6 | Example 7 | Comp. Ex. A | Comp. Ex. B | Example 8 |
|---|---|---|---|---|---|---|---|---|---|
| (instrumented) | 0° C. | kJ/m² | 80 | 85 | 96 | 115 | 144 | 74 | 101 |
| (ISO 179-2/1eU) | -20° C. | kJ/m² | 16 | 16 | 16 | 17 | 20 | 16 | 16 |
| Charpy notched impact toughness: | +23° C. | kJ/m² | 4.0 | 4.4 | 4.9 | 5.3 | 6.4 | 4.1 | 5 |
| (instrumented) | 0° C. | kJ/m² | 1.2 | 1.4 | 1.5 | 1.5 | 1.8 | 1.2 | 2 |
| (ISO 179-2/1eA) | -20° C. | kJ/m² | 1.0 | 0.9 | 0.9 | 0.9 | 0.9 | 1.0 | 1 |
| Haze (ASTM D 1003): |  | % | 14[1] | 16[1] | 17[1] | 17[1] | 6[3] | 6[3] | 16[1] |
| Proportion of isotactic meso diads[2] |  | % | >80 | >80 | >80 | >80 | — | — | >80 |

[1] Test carried out on 2 mm disks
[2] Based on all propene diads
[3] Test carried out on 1 mm disks It can be seen from Table 1 that the novel polymers of propene (Examples 4 to 8) have, compared to the polymers known from the prior art (see Comparative Examples A and B), a better stiffness/impact toughness ratio, very low proportions of xylene-soluble material and still a sufficiently good transparency (haze).

We claim:

1. A polymer of propene consisting essentially of from 50 to 99.9% by weight of an isotactic random propene copolymer (A') and from 0.1 to 50% by weight of a propene homopolymer or a propene copolymer (B'), wherein a) the propene copolymer (A') consists of from 80 to 99.9 mol % of propene and from 0.1 to 20 mol % of ethene and/or a $C_4$–$C_{12}$-1-olefin, at least 80% of all propene diads are isotactic meso diads, the propene copolymer (A') has a proportion ($X_S$) of material soluble in xylene at 20° C. which satisfies the inequality (1)

$$(X_S) < 542\,400\,\exp(-0.1 T_M) + 0.5 \quad (1),$$

the tensile modulus of elasticity (E) of the propene copolymer (A') in MPa, determined in accordance with ISO 527, obeys the inequality (2)

$$(E) > 1.9 \times 10^{-11} (T_M)^{6.34} + 180\,\text{MPa} \quad (2),$$

where in both inequalities (1) and (2) $T_M$ is the melting point in ° C., and b) the propene homopolymer or the propene copolymer (B') consists of from 80 to 100 mol % of propene and from 0 to 20 mol % of ethene and/or a $C_4$–$C_{12}$-1-olefin, at least 55% of all regioregular propene diads are isotactic meso diads, an enthalpy of fusion $\Delta H_m$ of less than 50 J/g is observed in the DSC measurement of (B') and no crystalline ex sequences are detectable.

2. A polymer of propene as claimed in claim 1, wherein the isotactic propene copolymer (A') consists of from 90 to 99.5 mol % of propene, where at least 80% of all propene diads are isotactic meso diads, and from 0.5 to 10 mol % of ethene and/or a $C_4$–$C_{12}$-1-olefin.

3. A polymer of propene as claimed in claim 1, wherein the component (B') is a propene homopolymer.

4. A polymer of propene as claimed in claim 1, wherein the component (B') is a propene copolymer consisting of from 80 to 99.99 mol % of propene and from 0.01 to 20 mol % of ethene and/or a $C_4$–$C_{12}$-1-olefin.

5. A polymer of propene as claimed in claim 1, wherein the proportion of regioirregular '1-3'-inserted propene units in the component (B') is at least 4%, based on all propene units.

6. A polymer of propene as claimed in claim 1, wherein the component (B') has a glass transition temperature ($T_g$) of less than −10° C.

7. A polymer of propene as claimed in claim 1 which consists of from 80 to 99.9 mol % of propene and from 0.1 to 20 mol % of ethene and/or a $C_4$–$C_{12}$-1-olefin, in which at least 60% of all propene diads are isotactic meso diads, which has a tensile modulus of elasticity (E) in MPa, determined in accordance with ISO 527, which obeys the inequality (2')

$$(E) > 0.02093 (X)^2 - 8.762 (X) + 1780\,\text{MPa} \quad (2'),$$

where X is the Charpy impact toughness at 0° C. in accordance with ISO 179-2/1 eU, and which has a proportion of material which is soluble in xylene at 20° C. of less than 5% by weight.

8. A polymer of propene as claimed in claim 7 which has a tensile modulus of elasticity (E), determined in accordance with ISO 527, of more than 1150 MPa.

9. A process for preparing a polymer of propene as claimed in claim 1, which comprises physically mixing the propene copolymer (A') and the propene homopolymer or the propene copolymer (B') with one another at from 150 to 300° C. after they have each been prepared separately.

10. A process as claimed in claim 9, wherein the physical mixing is carried out in an extruder.

11. A process for preparing a polymer of propene as claimed in claim 1, which comprises jointly preparing the propene copolymer (A') and the propene homopolymer or the propene copolymer (B') by polymerization of the monomers at from −50 to 300° C. and pressures of from 0.5 to 3000 bar in the presence of a metallocene catalyst system comprising, in addition to a compound (C) capable of forming metallocenium ions, two different metallocene complexes (B).

12. A process as claimed in claim 11, wherein the metallocene catalyst system used further comprises an organic or inorganic support (A).

13. A film, fiber or molding obtained from a polymer of propene as claimed in claim 1 as essential component.

14. A metallocene catalyst produced polymer of propene consisting essentially of from 50 to 99.9% by weight of an isotactic random propene copolymer (A') and from 0.1 to 50% by weight of a propene homopolymer or a propene copolymer (B'), wherein a) the random propene copolymer (A') consists of from 80 to 99.9 mol % of propene and from 0.1 to 20 mol % of ethene and/or a $C_4$–$C_{12}$-1-olefin, at least 80% of all propene diads are isotactic meso diads, the propene copolymer (A') has a proportion ($X_S$) of material soluble in xylene at 20° C. which satisfies the inequality (1)

$$(X_S) < 542\,400\, \exp(-0.1 T_M) + 0.5 \qquad (1),$$

the tensile modulus of elasticity (E) of the propene copolymer (A') in MPa, determined in accordance with ISO 527, obeys the inequality (2)

$$(E) > 1.9 \times 10^{-11} (T_M)^{6.34} + 180 \text{MPa} \qquad (2),$$

wherein both inequalities (1) and (2) $T_M$ is the melting point in ° C., and b) the propene homopolymer of the propene copolymer (B') consists of from 80 to 100 mol % of propene and from 0 to 20 mol % of ethene and/or a $C_4$–$C_{12}$-1-olefin, at least 55% of all regioregular propene diads are isotactic meso diads, an enthalpy of fusion $\Delta H_m$ of less than 50 J/g is observed in the DSC measurement of (B') and no crystalline ex sequences are detectable.

* * * * *